US008744723B2

(12) United States Patent
Jones

(10) Patent No.: US 8,744,723 B2
(45) Date of Patent: Jun. 3, 2014

(54) METHOD OF INFORMING DEALER SERVICE OPERATION AND CUSTOMER OF VEHICLE MISFUELING IN NON-FLEX FUEL VEHICLES

(75) Inventor: Marie-Christine G. Jones, Bingham Farms, MI (US)

(73) Assignee: GM Global Technology Operations LLC

( * ) Notice: Subject to any disclaimer, the term of this patent is extended or adjusted under 35 U.S.C. 154(b) by 764 days.

(21) Appl. No.: 12/470,859

(22) Filed: May 22, 2009

(65) Prior Publication Data

US 2010/0299022 A1    Nov. 25, 2010

(51) Int. Cl.
 *G06F 7/00* (2006.01)
 *G06F 17/00* (2006.01)

(52) U.S. Cl.
 USPC .......................................... 701/103; 701/104

(58) Field of Classification Search
 USPC ............. 701/103, 104; 137/299, 571; 60/277, 60/275, 215, 287, 800; 123/445, 406.31, 123/406.32
 See application file for complete search history.

(56) References Cited

U.S. PATENT DOCUMENTS

| 6,397,583 | B1 * | 6/2002 | Davey et al. ..................... 60/277 |
| 7,159,623 | B1 * | 1/2007 | Carr et al. ........................ 141/94 |
| 7,283,810 | B1 * | 10/2007 | Arakawa et al. ............ 455/414.1 |
| 7,416,806 | B2 * | 8/2008 | Oshima et al. ................. 429/515 |
| 7,432,826 | B2 * | 10/2008 | Schwartz ....................... 340/902 |
| 8,014,933 | B2 * | 9/2011 | Joos et al. ....................... 701/111 |
| 8,061,121 | B2 * | 11/2011 | Haugen ........................... 60/285 |
| 2003/0075119 | A1 * | 4/2003 | Huff et al. ...................... 123/1 A |
| 2003/0095038 | A1 | 5/2003 | Dix |
| 2004/0198254 | A1 * | 10/2004 | Mizui et al. ...................... 455/99 |
| 2005/0112417 | A1 * | 5/2005 | Oshima et al. ................... 429/12 |
| 2005/0190039 | A1 * | 9/2005 | Aoyama et al. ............... 340/5.21 |
| 2006/0278283 | A1 * | 12/2006 | Gouzou et al. ................ 137/571 |
| 2007/0262855 | A1 * | 11/2007 | Zuta et al. ...................... 340/439 |
| 2009/0107113 | A1 * | 4/2009 | Thanasiu et al. ................ 60/276 |
| 2009/0114188 | A1 * | 5/2009 | Peters et al. ............. 123/406.19 |
| 2009/0251302 | A1 | 10/2009 | Cunningham |
| 2010/0191439 | A1 * | 7/2010 | Fabien .......................... 701/103 |

FOREIGN PATENT DOCUMENTS

| CN | 1242834 | 1/2000 |
| CN | 1652973 A | 8/2005 |

* cited by examiner

*Primary Examiner* — Khoi Tran

*Assistant Examiner* — Jorge Peche

(57) ABSTRACT

An engine control system comprises a fuel composition module, a comparison module, and a memory module. The fuel composition module determines a fuel composition and an amount of undesired fuel in the fuel composition. The comparison module compares the amount of undesired fuel to a misfueling threshold. The memory module records a misfueling event based on the comparison.

16 Claims, 3 Drawing Sheets

METHOD OF INFORMING DEALER SERVICE OPERATION AND CUSTOMER OF VEHICLE MISFUELING IN NON-FLEX FUEL VEHICLES

FIELD

The present disclosure relates to vehicle misfueling in non-flex fuel vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine system may be designed to operate using a particular type of fuel. For example, the engine system may be designed to operate using gasoline fuel. The engine system may reliably operate using an alternative type of fuel that includes predetermined amounts of a fuel additive. For example, the alternative type of fuel may be a mixture of 90% gasoline fuel and 10% ethanol fuel. When a type of fuel other than the particular or alternative type is used, the engine system may not operate properly. For example, using a different type of fuel may cause hardware failures and/or inaccurate diagnostics.

SUMMARY

An engine control system comprises a fuel composition module, a comparison module, and a memory module. The fuel composition module determines a fuel composition and an amount of undesired fuel in the fuel composition. The comparison module compares the amount of undesired fuel to a misfueling threshold.

The memory module records a misfueling event based on the comparison. In further features, the misfueling event occurs when the amount of undesired fuel is greater than or equal to the misfueling threshold. In other features, the recording includes storing at least one of the amount of undesired fuel, a date, a time of day, a location, and an amount of fuel.

In still other features, the engine control system further comprises a driver information center that provides at least one of a visual and audio alert based on the comparison. In still other features, the engine control system further comprises a diagnostic module that communicates with the memory module and receives the recording.

In further features, the diagnostic module displays the recording. A misfueling notification method comprises determines a fuel composition and an amount of undesired fuel in the fuel composition; comparing the amount of undesired fuel to a misfueling threshold; and recording a misfueling event based on the comparison.

In further features, the misfueling event occurs when the amount of undesired fuel is greater than or equal to the misfueling threshold. In other features, the recording includes storing at least one of the amount of undesired fuel, a date, a time of day, a location, and an amount of fuel. In still other features, the misfueling notification method further comprises providing at least one of a visual and audio alert based on the comparison.

In still other features, the misfueling notification method further comprises communicating with a diagnostic module that receives the recording. In further features, the misfueling notification method further comprises displaying the recording with the diagnostic module.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
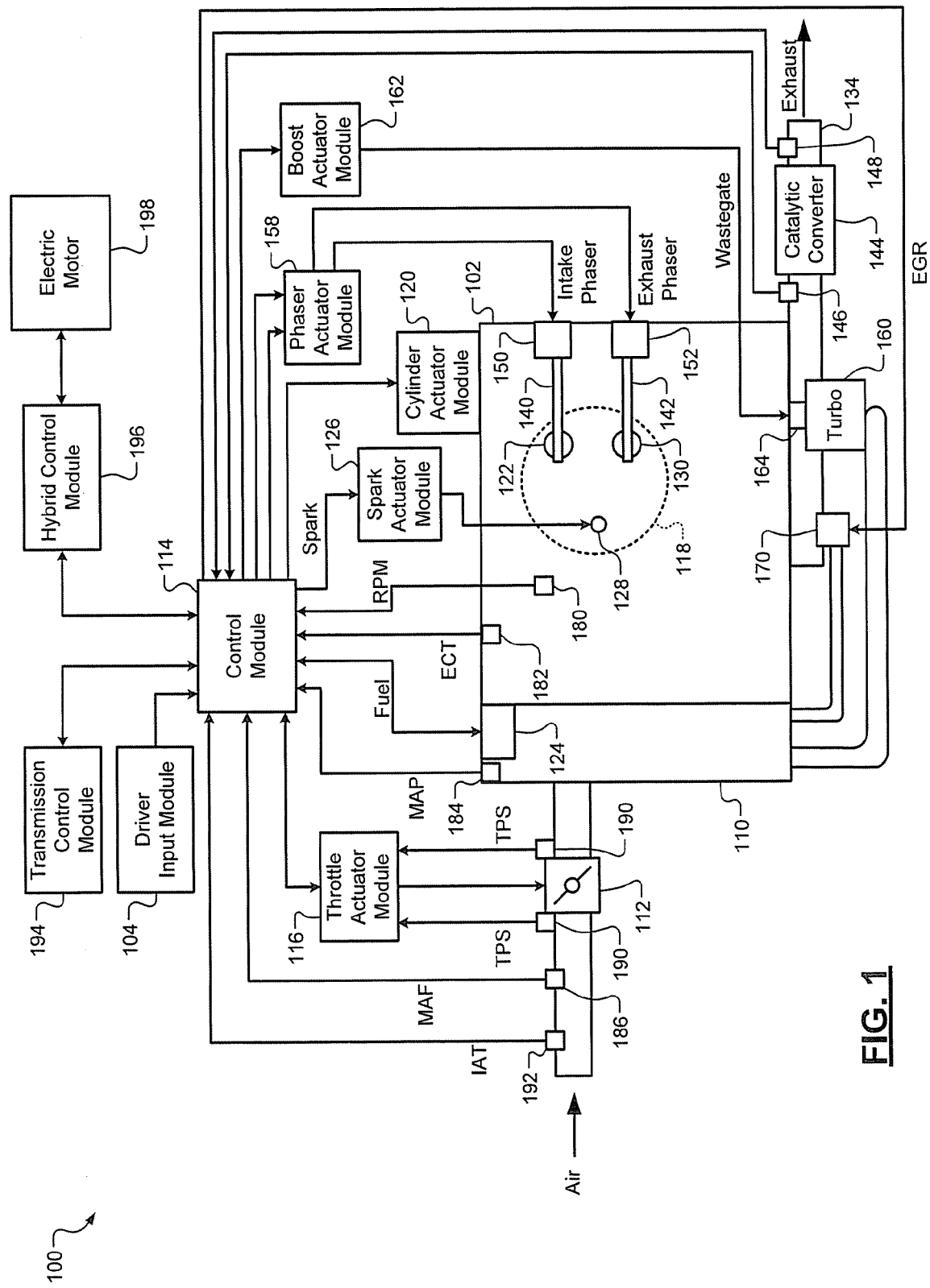
FIG. 1 is a functional block diagram of an exemplary engine system 100 according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine system may operate using a particular type of fuel. For example, the engine system may determine whether a different type of fuel is used. The engine system may determine the composition of the fuel. The engine system may determine an amount of an undesired fuel used in the fuel and compare the amount to a misfueling threshold. If the amount is less than the misfueling threshold, then the engine system may continue operating reliably. If the amount is greater than or equal to the misfueling threshold, then a misfueling notification may be generated.

Referring now to FIG. 1, a functional block diagram of an exemplary engine system 100 according to the principles of the present disclosure is shown. The engine system 100 includes an engine 102 that combusts an air/fuel mixture to produce drive torque for a vehicle based on a driver input module 104. Air is drawn into an intake manifold 110 through a throttle valve 112. A control module 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders. The control module 114 may instruct a cylinder actuator module 120 to selectively deactivate some of the cylinders to improve fuel economy.

Air from the intake manifold 110 is drawn into the cylinder 118 through an intake valve 122. The control module 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the control module 114, a spark actuator module 126 energizes a spark plug 128 in the cylinder 118, which ignites the air/fuel mixture. The timing of the spark may be specified relative to the time when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The exhaust system 134 includes a catalytic converter 144, a pre-converter $O_2$ sensor 146, and a post-converter $O_2$ sensor 148. The pre-converter $O_2$ sensor 146 is located upstream (with respect to the exhaust) of the catalytic converter 144, while the post-converter $O_2$ sensor 148 is located downstream of the catalytic converter 144.

The catalytic converter 144 controls emissions by increasing the rate of oxidization of hydrocarbons (HC) and carbon monoxide (CO) and the rate of reduction of nitrogen oxides ($NO_x$). To enable oxidization, the catalytic converter 144 requires $O_2$. The $O_2$ storage capacity of the catalytic converter 144 is indicative of an efficiency in oxidizing the HC and CO and in reducing $NO_x$.

The pre-converter $O_2$ sensor 146 communicates with the control module 114 and measures the $O_2$ content of the exhaust stream entering the catalytic converter 144. The post-converter $O_2$ sensor 148 communicates with the control module 114 and measures the $O_2$ content of the exhaust stream exiting the catalytic converter 144.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

The time at which the intake valve 122 is opened may be varied with respect to piston TDC by an intake cam phaser 150. The time at which the exhaust valve 130 is opened may be varied with respect to piston TDC by an exhaust cam phaser 152. A phaser actuator module 158 controls the intake cam phaser 150 and the exhaust cam phaser 152 based on signals from the control module 114.

The engine system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The air used to produce the compressed air charge may be taken from the intake manifold 110.

A wastegate 164 may allow exhaust gas to bypass the turbocharger 160, thereby reducing the turbocharger's output (or boost). The control module 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the heat of the compressed air charge that is generated when air is compressed and that may be increased by proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. In various implementations, the EGR valve 170 may be located after the turbocharger 160. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186. In various implementations, the MAF sensor 186 may be located in a housing with the throttle valve 112.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The control module 114 may use signals from the sensors to make control decisions for the engine system 100.

The control module 114 may communicate with a transmission control module 194 to coordinate shifting gears in a transmission (not shown). For example, the control module 114 may reduce torque during a gear shift. The control module 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, the control module 114, the transmission control module 194, and the hybrid control module 196 may be integrated into one or more modules.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is amount of spark advance. Other actuators include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

Figure 2:
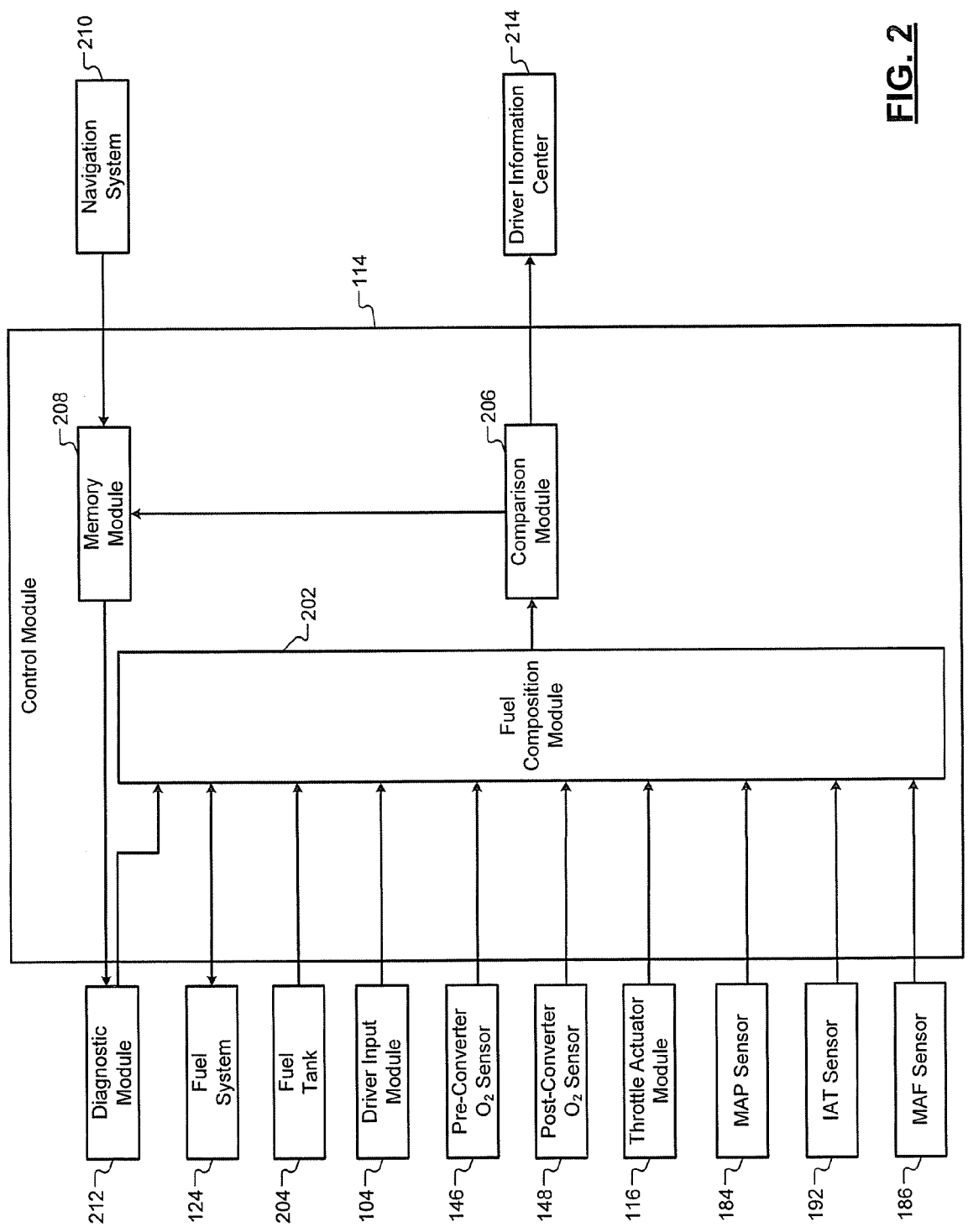
FIG. 2 is a functional block diagram of the control module 114 of FIG. 1 according to the principles of the present disclosure.

Referring now to FIG. 2, a functional block diagram of the control module 114 of FIG. 1 according to the principles of the present disclosure is shown. A fuel composition module 202 receives data from the fuel injection system 124, the driver input module 104, the pre-converter $O_2$ sensor 146, the post-converter $O_2$ sensor 148, the throttle actuator module 116, the MAF sensor 186, the IAT sensor 192, the MAP sensor 184, and a fuel tank 204. The fuel tank 204 contains the fuel used by the engine system 100.

The fuel composition module 202 estimates a composition of the fuel in the engine system 100 based on the data. In various implementations, the fuel composition module 202 may function as described in commonly assigned U.S. Pat. No. 7,159,623, issued on Jan. 9, 2007 and entitled "Apparatus and Methods for Estimating Vehicle Fuel Composition."

The engine system 100 may be designed to reliably operate using gasoline fuel. Certain fuel types may include a percentage of another fuel such as ethanol. Damage may be caused to the engine system 100 when the fuel is composed of more than a predetermined percentage of ethanol. For example, the engine system 100 may not be designed to reliably operate when the fuel is composed of greater than 10% ethanol. Although ethanol and gasoline may be mentioned for example purposes, it should be recognized that other fuels may be used.

A comparison module 206 compares an amount of undesired fuel to a misfueling threshold. For example, the misfueling threshold may be 10% ethanol. The comparison module 206 determines whether the amount of undesired fuel exceeds the misfueling threshold. A misfueling event occurs when the comparison module 206 determines that the amount of undesired fuel exceeds the misfueling threshold. The misfueling event may be an event that causes the amount of undesired fuel to exceed the misfueling threshold. For example only, adding the undesired fuel to the engine system 100 may be considered a misfueling event.

If the comparison module 206 determines that the amount of undesired fuel exceeds the misfueling threshold, then the comparison module 206 may notify a memory module 208. The memory module 208 may record the misfueling event. For example, the memory module 208 may store the amount of undesired fuel. The memory module 208 may store the date, the time of day, and the location of the engine system 100. For example, a navigation system 210 may provide the date, the time of day, and the location of the engine system 100.

A diagnostic module 212 may retrieve and display the amount of undesired fuel, the date, the time of day, and the location of the engine system 100. The diagnostic module 212 may update algorithms used to calculate fuel composition within the fuel composition module 202. The diagnostic module 212 may be external to the engine system 100. For example only, the diagnostic module 212 may be a service station or a handheld device.

A driver information center 214 displays visual and audio alerts to a user. When the comparison module 206 determines that the misfueling threshold is exceeded, the driver information center 214 may generate a visual and/or an audio alert. For example, a message may be displayed that indicates that the misfueling threshold is exceeded.

Figure 3:
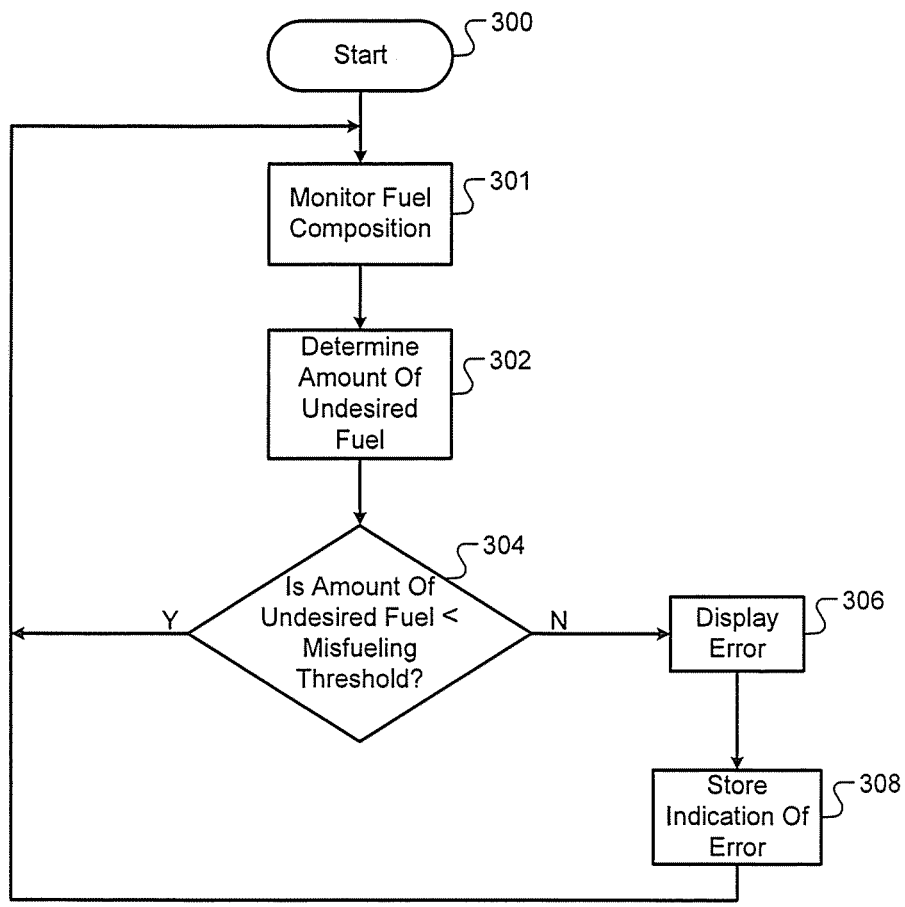
FIG. 3 is a flowchart that depicts steps in a misfueling notification method according to the principles of the present disclosure.

Referring now to FIG. 3, a flowchart that depicts steps in a misfueling notification method according to the principles of the present disclosure is shown. Control begins in step 300. In step 301, control monitors fuel composition. In step 302, control determines an amount of undesired fuel (e.g. such as ethanol or another additive) in the fuel composition. In step 304, control determines whether the amount of undesired fuel exceeds the misfueling threshold. If control determines that the amount of undesired fuel is less than the misfueling threshold, then control returns to step 301; otherwise, control continues to step 306. In step 306, control displays an error or other message that indicates a misfueling event. In step 308, control stores an indication of the error. For example, the date, time of day, the location of the engine system 100, the amount of undesired fuel, and/or the amount of fuel may be stored.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
   a fuel composition module that determines a fuel composition and an amount of undesired fuel in said fuel composition;
   a comparison module that compares said amount of undesired fuel to a misfueling threshold; and
   a memory module that records a misfueling event in response to said amount of undesired fuel being greater than or equal to said misfueling threshold.

2. The engine control system of claim 1 wherein said memory module records said misfueling event by storing at least one of said amount of undesired fuel, a date, a time of day, and a location.

3. The engine control system of claim 1 further comprising a driver information center that provides at least one of a visual and audio alert based on said comparison.

4. The engine control system of claim 3 wherein said driver information center provides said at least one of a visual and audio alert when said amount of undesired fuel is greater than said misfueling threshold.

5. The engine control system of claim 4 wherein said at least one of a visual and audio alert indicates that said amount of undesired fuel is greater than said misfueling threshold.

6. The engine control system of claim 1 further comprising a diagnostic module that communicates with said memory module and receives said recording.

7. The engine control system of claim 6 wherein said diagnostic module displays said recording.

8. The engine control system of claim 1 wherein said memory module records said misfueling event by storing said amount of undesired fuel and at least one of a date, a time of day, and a location of said misfueling event.

9. A misfueling notification method comprising:
   determining a fuel composition;
   determining an amount of undesired fuel in said fuel composition;

comparing said amount of undesired fuel to a misfueling threshold; and recording a misfueling event in non-volatile memory in response to said amount of undesired fuel being greater than or equal to said misfueling threshold.

10. The misfueling notification method of claim 9 further comprising recording said misfueling event by storing at least one of said amount of undesired fuel, a date, a time of day, and a location.

11. The misfueling notification method of claim 9 further comprising providing at least one of a visual and audio alert based on said comparison.

12. The misfueling notification method of claim 11 further comprising providing said at least one of a visual and audio alert when said amount of undesired fuel is greater than said misfueling threshold.

13. The misfueling notification method of claim 12 wherein said at least one of a visual and audio alert indicates that said amount of undesired fuel is greater than said misfueling threshold.

14. The misfueling notification method of claim 9 further comprising communicating with a diagnostic module that receives said recording.

15. The misfueling notification method of claim 14 further comprising displaying said recording with said diagnostic module.

16. The misfueling notification method of claim 9 further comprising recording said misfueling event by storing said amount of undesired fuel and at least one of a date, a time of day, and a location of said misfueling event.

* * * * *